D. H. MOORE.
VEHICLE TIRE.
APPLICATION FILED FEB. 4, 1920.
1,352,305. Patented Sept. 7, 1920.
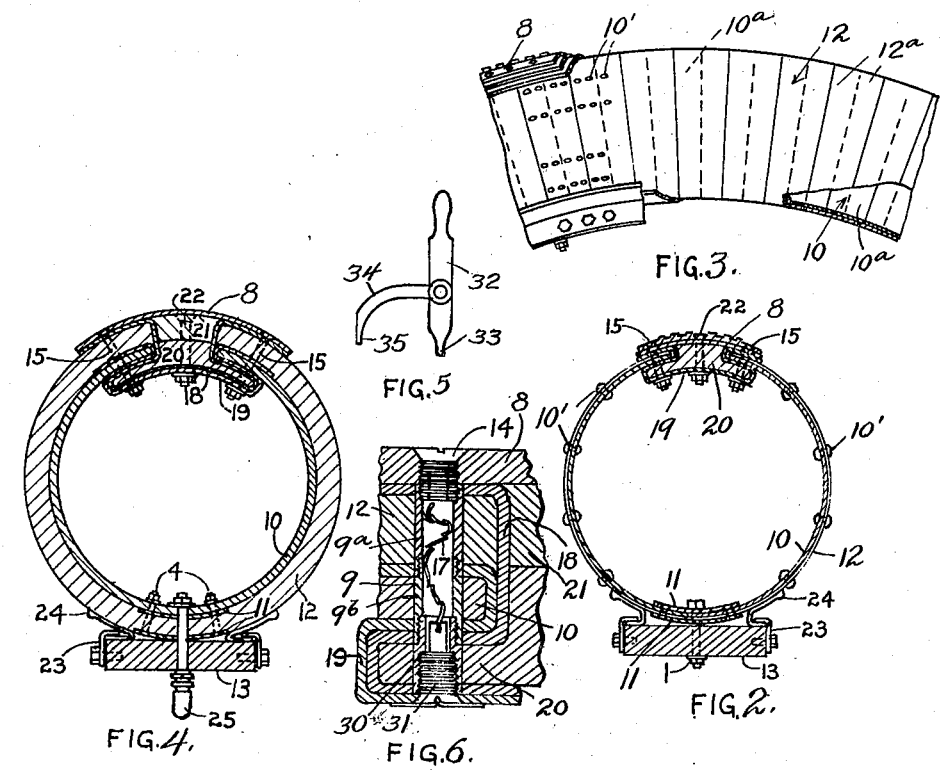
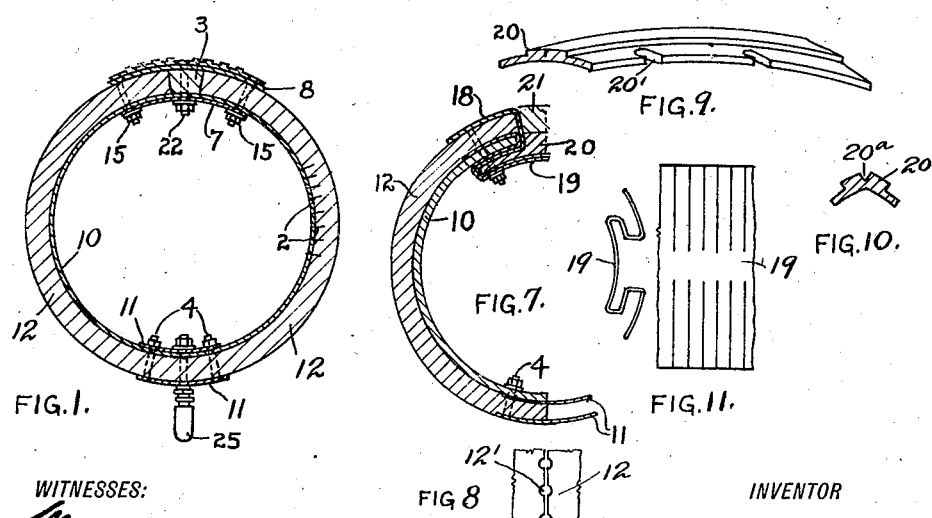

UNITED STATES PATENT OFFICE.

DAVID H. MOORE, OF PORT CLINTON, OHIO.

VEHICLE-TIRE.

1,352,305.  Specification of Letters Patent.  Patented Sept. 7, 1920.

Application filed February 4, 1920. Serial No. 356,326.

*To all whom it may concern:*

Be it known that I, DAVID H. MOORE, a citizen of the United States, residing in Port Clinton, in the county of Ottawa and State of Ohio, have invented new and useful Improvements in Vehicle-Tires, of which the following is a specification.

This invention relates to a novel construction of tire for vehicles and the principal object of the invention is to construct a tire which will have great wearing qualities and which will eliminate punctures and blowouts.

Another object of the invention is to provide means whereby the use of the ordinary rubber inner tube is rendered unnecessary. The invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings, wherein like numerals designate like or corresponding parts throughout the several views, and in which:

Figure 1 is a transverse sectional view taken through a tire constructed in accordance with my invention.

Fig. 2 is a transverse sectional view taken through a slightly modified form of my tire.

Fig. 3 is a side elevation, partly in section, of the tire shown in Fig. 2.

Fig. 4 is a transverse sectional view taken through a still further modified form of my device.

Fig. 5 is a side elevation of a wrench employed in the construction of my tire.

Fig. 6 is an enlarged sectional view showing the structure employed in the tire shown in Fig. 4 to attach side sections of the tire and tread portion thereof together.

Fig. 7 is a sectional view showing one of the side sections of my tire with its associated elements.

Fig. 8 is a fragmentary bottom plan view of the meeting edges of the side sections of the tire.

Fig. 9 is a fragmentary perspective view of the filler strip employed in the construction of my tire.

Fig. 10 is a sectional view taken through the filler strip showing the manner in which the same is bent in placing the same in position in the tire.

Fig. 11 is a combined end elevation and plan of the blank of retaining strips employed in the construction of the modified forms shown in Figs. 2 to 7 inclusive.

In the construction of my tire, casing sections 12 are employed, each comprising an annular side casing section substantially semi-circular in form, as more clearly shown in Fig. 7. These casing sections are provided at their inner edges, which are adapted to coact, with semi-circular recesses 12′ adapted to coact to form bolt receiving apertures.

Transversely curved plates 11 are employed to secure the inner meeting edges of the casing sections 12 together, each of these plates being annular in form and being curved to conform to the curvature of the casing. One plate is arranged upon each side of the casing and the plates and casing are clamped together in any suitable manner as by means of bolts 4. The apertures formed by the recesses 12′ receive bolts 1 by means of which the completed tire is secured to the felly 13 of the wheel, and a valve 25 by means of which the tire may be inflated if desired.

A lining 10 is employed for the casing sections 12. In the form shown in Fig. 1, this lining takes the form of canvas or other fabric, either stitched to the casing sections 12 as indicated at 2, or cemented thereto in any suitable manner. The lining member 10 may be either placed beneath the plate 11 arranged inwardly of the tire, as shown in Figs. 1 and 2, or may be placed exteriorly of the plate 11 as indicated in Figs. 4 to 7.

In the form shown in Figs. 2 and 3, the casing sections 12 are formed of transverse strips of metal, 12ª, and the lining section 10 is likewise formed of similar transverse strips 10ª arranged interiorly of the strips of the casing section, and staggered with relation thereto. The strips 10ª and 12ª are secured together in any suitable manner, as by means of rivets 10′.

In the form illustrated in Figs. 4 to 7 inclusive, the lining member 10 is formed of metal and is composed of two annular members which are complementary and substantially semi-circular in form.

It will be noted that the side members 12 of the casing and the lining 10 terminate just short of that portion of the tire commonly known as the tread portion. In the form shown in Fig. 1 this space is filled by a filler 3 which may be of the same construction as the tread portion or of any other suitable material. The plate 7 is arranged interiorly of the tire and a tread plate 8, preferably corrugated, is arranged exteriorly thereof and the casing sections 12, and plates 7 and 8 are secured together by means of bolts 15 or the like. Bolts 22 are passed through the plates 7 and 8 and the filler 3, securing the plates and filler in assembled relation.

In the form illustrated in Figs. 2 and 3, the filler 3 and plate 7 are combined in a single plate 20 which need not be of metal but may be formed of rubber, canvas or the like. Where these plates are formed of rubber or similar material, protecting strips 19 are employed, which are passed about the base of the plate 20 and the shoulders thereof and bent back upon the face of the tire. The bolts 15 are then passed through the plate 8 and the plate 20 which is provided with notches 20′ for the reception thereof and the protecting strip 19 securing these sections together. Bolts 22 are likewise employed extending through the filler portion of the plate 20 and through the tread plate 8 and protecting strip or plate 19, securing the same together centrally.

In the form shown in Figs. 4 to 7 inclusive, the plate 20 previously described, is employed interiorly of the tire with the filler portion thereof extending outwardly into the space formed between the edges of the lining member 10. On account of the thickness of the tread portion 12, a further filler portion is necessary and is supplied as shown at 21 in these figures. The protecting strip 19 is likewise employed and positioned about the base of the filler strip 20, but is not, in this form of construction, passed about the exterior of the tire but has its edges disposed intermediate the lining 10 and the casing sections 12. A second protecting strip 18 is likewise employed which is passed about the face of the filler strip 20 and upwardly and about the face of the tire. The tread plate 8 is then placed in position and the bolts 15 employed passing through the plate 8 and protecting strips 18 and 19 and filling strip 20. The bolts 22 pass through the strips 18 and 19, the filler portion of the filler plate 20, the filler 21 and the tread plate 8, securing these portions together centrally.

It will be obvious to those familiar with the art that in order to place the filler strips 20 in position these filler strips must necessarily be distorted, and in order to assist in this distortion they are provided centrally with a score $20^a$ which readily permits of this distortion as illustrated in Fig. 10.

It will furthermore be obvious that in placing the bolts in one side of the tread portion of the tire, considerable difficulty will be experienced unless some special form of bolt is employed. Such a bolt I have illustrated in Fig. 6. This bolt consists of a sleeve portion 9 interiorly threaded at one end to receive the screw 14 and at the other end to receive the screw 31. The construction of this bolt will be rendered obvious by an inspection of Fig. 6. In placing the bolts in position, a wire 17 is secured to the sleeve 30 after the screw 31 has been placed in position. This wire serves both as a guide and as a means to prevent turning of the sleeve 30 during the period in which the section 9 is being placed in position. An inspection of Fig. 6 will further reveal the fact that the sleeve 9 is of larger diameter than the aperture formed in the tread plate 8 and that consequently the tread plate will be brought into firm engagement with the upper end of the sleeve by the screw 14. The sleeve 9 may if so desired be formed of a pair of sections $9^a$ and $9^b$, the section $9^a$ being provided at each end with internal screw threads and the section $9^b$ being provided at one end with internal screw threads and at the opposite end with external screw threads. The two sections when joined together will form the complete sleeve 9, provided at each end with internal screw threads, as described. In order to further assist in alining the apertures, in placing the bolts in position, I employ a wrench of the type shown in Fig. 5 comprising a hand grip portion 32 having a reduced end 33 adapted to enter one aperture, and a portion 34 pivoted to the hand grip portion and likewise provided with a reduced end 35 adapted to enter a second aperture. It will be obvious that by shifting the portion 32 the relation of the reduced portions 33 and 35 may be altered as desired, within certain limits, and the openings accordingly brought into alinement.

Having now described my invention, what I claim is:

1. A tire of the class described, comprising a casing composed of a pair of coacting sections substantially semi-circular in cross section, annular plates engaging with the inner edges of the two sections, bolts for securing said parts together, an annular plate located at the outer circumference of the tire and within said tire and having a portion extending between the outer edges of the two sections, an outer tread plate and bolts passing through said plates and the sections of the casing.

2. A tire of the class described, comprising a casing formed of a pair of coacting sections substantially semi-circular in cross section, a tubular lining member formed of two sections and located within the casing, means for securing the edges of the sections of the tubular member and the casing sections together at the inner circumference of the tire, an annular plate located within the tubular member in the outer circumference of the tire and having a portion projecting between the edges of the sections of the tubular lining member and casing, strips carried by said plate having their ends looped over the tubular member and casing, a tread plate and means for securing the tread plate, the edges of the tubular lining member and the casing, the strips and annular plate together.

3. A tire of the class described, comprising a casing embodying a pair of annular side sections substantially semi-circular in cross section, annular plates engaging the inner edges of said sections, securing means extending through said plates and said sections, an annular plate located at the outer edges of said side sections and interiorly of said tire, an annular tread plate arranged exteriorly of the tire, a filler strip arranged intermediate the outer edges of said side sections and intermediate said last named plates, securing means extending through said last named plates and said side sections, and securing means extending through said last named plates and said filler strip.

4. A tire of the class described embodying a casing composed of a pair of coacting sections substantially semi-circular in cross section, each of said sections comprising a plurality of transverse strips of metal forming a casing section and a plurality of other transverse strips of metal arranged interiorly of said first named strips and forming a lining section, the strips of said casing section being staggered with relation to the strips of said lining section and being secured thereto, annular plates engaging with the inner edges of said sections, securing means extending through said plates and said sections, an annular plate located at the outer circumference of the tire and within said tire and having a portion extending between the outer edges of said sections, an annular tread plate arranged exteriorly of said outer edges, securing means extending through said annular tread plate and the outer edges of said sections and securing means extending through said tread plate and the portion of said annular plate lying between the outer edges of the two sections.

5. A tire of the class described, comprising a casing formed of a pair of coacting sections substantially semi-circular in cross section, a tubular lining member formed of two sections and located within the casing, means for clamping the edges of the sections of the tubular member and the casing sections together at the inner circumference of the tire, an annular plate located within the tubular member in the outer circumference of the tire and having a portion projecting between the edges of the sections of the tubular lining member and casing, strips carried by said plate having their ends looped over the tubular member and casing, a tread plate and means for securing the tread plate, the edges of the tubular lining member and the casing, the strips and annular plate together, said "means for securing" comprising a pair of sleeves each provided at one end with means whereby they may be secured together and at the other with interior screw threads adapted to receive a screw.

In testimony whereof, I affix my signature.

D. H. MOORE.